(12) United States Patent
Chhabra et al.

(10) Patent No.: US 9,681,370 B2
(45) Date of Patent: Jun. 13, 2017

(54) CO-LOCATED NETWORK SELECTION ALGORITHM

(71) Applicant: Apple Inc., Cupertino, CA (US)

(72) Inventors: Kapil Chhabra, Cupertino, CA (US); Welly Kasten, San Jose, CA (US)

(73) Assignee: Apple Inc., Cupertino, CA (US)

( * ) Notice: Subject to any disclaimer, the term of this patent is extended or adjusted under 35 U.S.C. 154(b) by 21 days.

(21) Appl. No.: 14/311,135

(22) Filed: Jun. 20, 2014

(65) Prior Publication Data

US 2015/0373633 A1    Dec. 24, 2015

(51) Int. Cl.
*H04W 4/00* (2009.01)
*H04W 48/18* (2009.01)
*H04W 8/18* (2009.01)

(52) U.S. Cl.
CPC ............ *H04W 48/18* (2013.01); *H04W 8/18* (2013.01)

(58) Field of Classification Search
CPC .................................................. H04W 48/18
USPC ........................................... 455/435.2, 435.3
See application file for complete search history.

(56) References Cited

U.S. PATENT DOCUMENTS

| 6,094,581 | A * | 7/2000 | Fried ..................... H04W 48/20 455/449 |
| 8,010,105 | B2 | 8/2011 | Buckley et al. |
| 8,811,201 | B2 | 8/2014 | Sachs et al. |
| 2004/0022216 | A1* | 2/2004 | Shi ....................... H04W 76/02 370/335 |
| 2010/0075671 | A1* | 3/2010 | Kubo ..................... H04W 8/183 455/434 |
| 2010/0111057 | A1* | 5/2010 | Nakamura ........ H04W 36/0061 370/338 |
| 2011/0299422 | A1* | 12/2011 | Kim ...................... H04W 48/16 370/253 |
| 2011/0312365 | A1* | 12/2011 | Hatano ................. H04W 48/16 455/517 |
| 2012/0077488 | A1* | 3/2012 | Unger ................... H04W 48/18 455/432.1 |
| 2014/0003408 | A1* | 1/2014 | Chhabra .............. H04W 48/16 370/338 |
| 2014/0204904 | A1 | 7/2014 | Xiang et al. |
| 2014/0254605 | A1* | 9/2014 | Anumala ................ H04L 45/54 370/401 |
| 2015/0215766 | A1* | 7/2015 | Russell ................... H04W 8/02 455/433 |

* cited by examiner

*Primary Examiner* — Rafael Pérez-Gutiérrez
*Assistant Examiner* — Mark G. Pannell
(74) *Attorney, Agent, or Firm* — Meyertons Hood Kivlin Kowert & Goetzel, P.C.; Jeffrey C. Hood

(57) ABSTRACT

A wireless device may automatically connect to a preferred wireless network, such as a preferred Wi-Fi network. The wireless device may order a plurality of wireless networks according to initial criteria, such as the time the wireless device last connected to each wireless network. Preference rules may then be applied to reorder the wireless networks. Each preference rule may be applied only if an associated score meets a threshold. A scan may be performed to determine which of the wireless networks are available for connection. The wireless device may automatically connect to the highest-ordered available wireless network. The scores associated with the preference rules may be modified in response to events that indicate a user preference for one or more of the wireless networks, such as manually switching from one network to another.

20 Claims, 5 Drawing Sheets

CO-LOCATED NETWORK SELECTION ALGORITHM

FIELD

The present disclosure relates to wireless devices, and more particularly to a system and method for a wireless device to automatically select a preferred wireless network.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard and are marketed under the Wi-Fi brand name. WLAN networks link one or more devices to a wireless access point, which in turn provides connectivity to the wider Internet.

In 802.11 systems, devices that wirelessly connect to each other are referred to as "stations" or STA for short. Wireless stations can be either wireless access points or clients. Access points (APs), also referred to as wireless routers, act as base stations for the wireless network. APs transmit and receive radio frequency signals for communication with wireless client devices. APs also typically couple to the Internet in a wired fashion. Wireless clients operating on an 802.11 network can be any of various devices such as laptops, tablet devices, smart phones, or fixed devices such as desktop computers. Wireless client devices are referred to herein as wireless devices, STA devices, or simply as "STA".

In 802.11 systems, a station may be within range of multiple APs operating on different wireless networks. A station may be configured to automatically join a network, based on which of the different networks was joined by the wireless device most recently in the past. However, a user may prefer to select a network based on some other criteria. Previous 802.11 systems do not account for such additional user preferences, thus requiring the user to manually switch from the automatically joined network to the preferred network.

For example, a wireless device may be capable of joining either of two wireless networks (e.g., Wi-Fi networks) in a residence. For example, the wireless device may detect both a personal home Wi-Fi network that is available only within the residence, and a public community Wi-Fi network that is available within the residence and also throughout the rest of the community. A user may prefer to use the home Wi-Fi network when it is available, e.g., because it has a higher data transfer rate, greater signal strength, superior security, etc. Thus, the user may desire that the wireless device automatically connect to the home Wi-Fi network when it is available, but connect to the community Wi-Fi network when the home Wi-Fi network becomes unavailable (e.g., when the user leaves the residence).

However, in previous systems, a wireless device authorized to automatically join a Wi-Fi network would automatically join the available network most recently joined in the past. For example, the wireless device may have joined the community Wi-Fi network to connect to the internet while away from the residence. Then, if the user attempted to connect to the internet upon returning to the residence, the wireless device would detect both the community Wi-Fi network and the home Wi-Fi network. Because the community Wi-Fi network was joined more recently than the home Wi-Fi network, the wireless device would automatically join the community Wi-Fi network. The user would then be required to manually switch to the home Wi-Fi network to satisfy his preference.

If the user becomes frustrated with the wireless device automatically joining the community Wi-Fi network, he may disable the option enabling the wireless device to automatically join networks. However, the user would then still be required to manually join the home Wi-Fi network when in the residence, and would also be required to manually join the community Wi-Fi network when not in the residence.

Therefore, an improved wireless device is desired that can account for user preferences when automatically selecting a wireless network.

SUMMARY

Embodiments are presented herein of, inter alia, a method for a wireless device to generate a wireless network preference list, and of a device configured to implement the method.

According to the techniques described herein, a wireless device may order a plurality of wireless networks based on an initial factor, such as a time that the wireless device last joined each of the wireless networks. For example, more recently joined wireless networks may be ordered higher than less recently joined networks. The ordered plurality of wireless networks may include a first wireless network that is ordered higher than a second wireless network. The wireless device may determine that a relationship score indicating a degree to which the second wireless network is preferred over the first wireless network meets a defined threshold. In response, the wireless device may change the order of the plurality of wireless networks such that the second wireless network is ordered higher than the first wireless network. The wireless device may then determine that at least one wireless network of the plurality of wireless networks is available for connection, and automatically connect to the highest ordered wireless network of the available wireless networks.

In some embodiments, the wireless device may determine that the relationship score is associated with a geographic location. The wireless device may further determine that it is presently located at the geographic location. The changing the order of the plurality of wireless networks may therefore be further in response to the determining that the wireless device is located at the geographic location.

After automatically connecting to the highest ordered available wireless network, the wireless device may determine that another wireless network of the plurality of wireless networks has become available for connection. The other wireless network may be higher-ordered than the wireless network to which the wireless device had automatically connected. Therefore, the wireless device may connect to the other wireless network.

The wireless network may also receive from a user an indication to switch from the first wireless network to the second wireless network. In response, the wireless device may increase the relationship score. Alternatively, the wireless device may receive an indication to switch from the second wireless network to the first wireless network. In response, the wireless device may reduce the relationship score.

The wireless device may maintain multiple relationship scores, wherein the above-referenced relationship score may be referred to as a first relationship score. After the wireless device has switched to the second wireless network, the wireless device may receive a further indication to switch from the second wireless network to a third wireless network. In response, the wireless device may increase a second relationship score of the plurality of relationship scores. The second relationship score may indicate a degree to which the third wireless network is preferred over the second wireless network.

When dealing with multiple relationship scores, the wireless device may determining a logical inconsistency between at least two of the relationship scores. In response, the wireless device may delete one or more of the at least two relationship scores.

In another embodiment, the wireless device may receive a network profile indicating that the second wireless network is preferred over the first wireless network. In response, the wireless device may set the relationship score to meet the threshold.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the preferred embodiment is considered in conjunction with the following drawings, in which.

Figure 1:
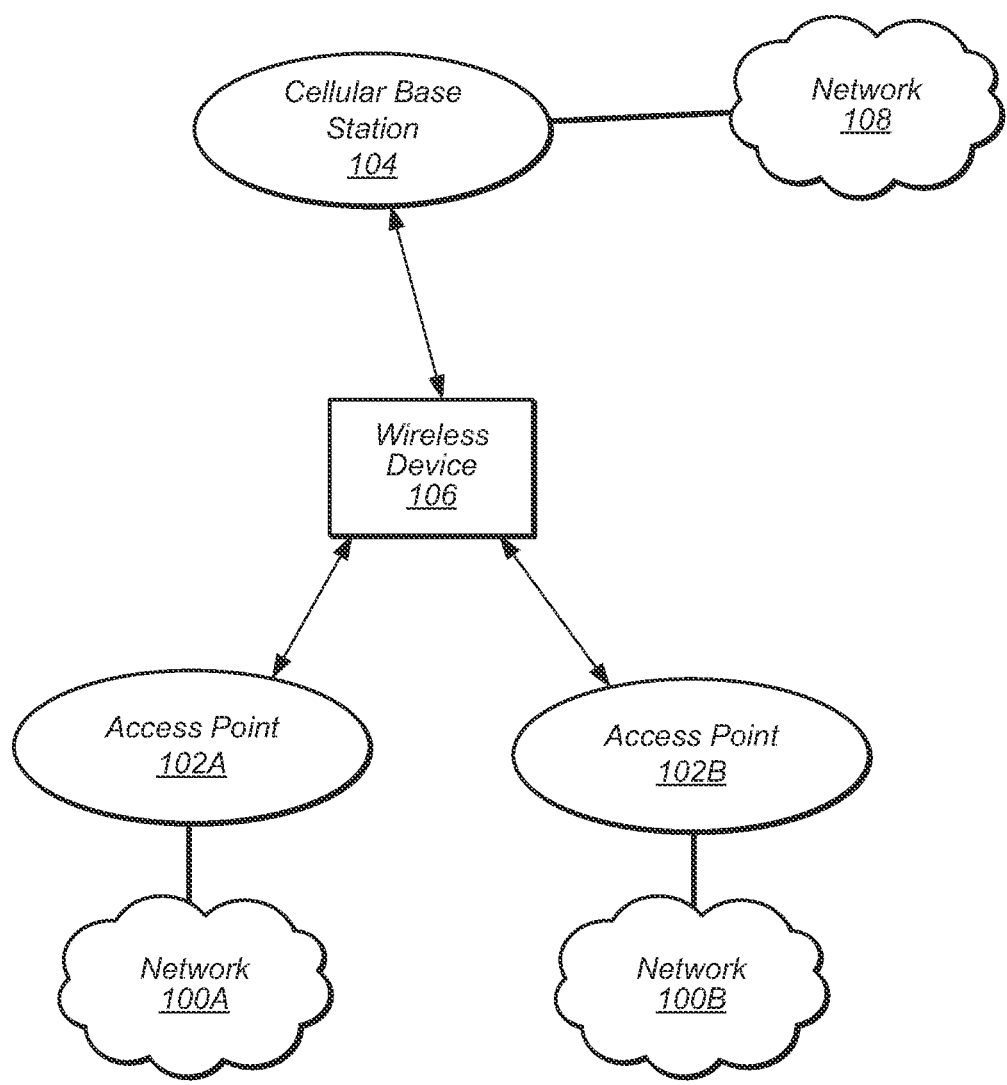
FIG. 1 illustrates an exemplary (and simplified) wireless communication system.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Incorporation by Reference

U.S. Patent Publication No. 2014/0003408 titled "Methods and apparatus for network selection in overlapping network environments", whose inventors are Kapil Chhabra and Artiom Shamis, is hereby incorporated by reference in its entirety as though fully and completely set forth herein.

Terms

The following is a glossary of terms used in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

Wireless Device—any of various types of computer systems devices which are mobile or portable and which performs wireless communications. Examples of wireless devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "wireless device" can be broadly defined to encompass any electronic, computing, and/or telecommunications device (or combination of devices) which is easily transported by a user and capable of wireless communication. A wireless device which may be used in a Wi-Fi context may alternatively be referred to as a "station" or "STA" in some cases.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

IEEE 802.11—refers to technology based on IEEE 802.11 wireless standards such as 802.11a, 802.11.b, 802.11g, 802.11n, 802.11-2012, 802.11ac, and/or other IEEE 802.11 standards. IEEE 802.11 technology may also be referred to as "Wi-Fi" or "wireless local area network (WLAN)" technology.

Figure 2:
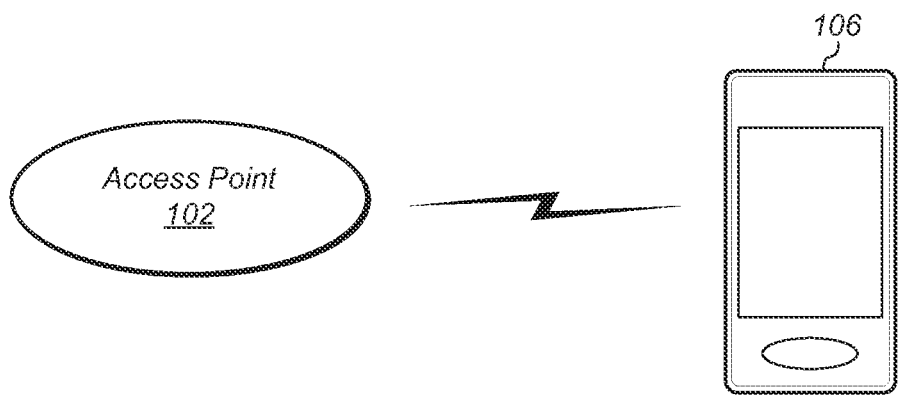
FIG. 2 illustrates an access point (AP) in communication with a user station (STA)

FIGS. 1-2—Communication System

FIG. 1 illustrates an exemplary (and simplified) wireless communication system. It is noted that the system of FIG. 1 is merely one example of a possible system, and embodiments may be implemented in any of various systems, as desired.

As shown, the exemplary wireless communication system includes a user device 106 that communicates over a transmission medium with one or more access points such as 102A or 102B. In some embodiments, the communication system may include additional access points. The user device may be referred to herein as a wireless device.

Each of the access points 102A and 102B may be an access point providing a wireless local area network (WLAN). Each access point 102A and 102B may be equipped to communicate with a network 100A or 100B (e.g., a local area network (LAN)). Each of the networks 100A and 100B may be further connected to each other or to other networks (e.g., a wide area network (WAN), such as the Internet, among various possibilities). Thus, each of the access points 102A and 102B may facilitate communication between the wireless device 106 and one or more of the networks 100A and 100B. The access points 102 and the wireless device 106 may be configured to communicate over the transmission medium using Wi-Fi, including any of various versions of IEEE 802.11 (e.g., a, b, g, n, ac, etc.).

The wireless device 106 may also be configured to communicate with a base station 104. The base station 104 may be a base transceiver station (BTS) or cell site (a "cellular base station"), and may include hardware that enables wireless communication with wireless device 106 according to one or more cellular communication protocols. The wireless device 106 and the cellular base station 104 may communicate using any of various cellular communication technologies such as GSM, UMTS (WCDMA), LTE, LTE-Advanced (LTE-A), 3GPP2 CDMA2000 (e.g., 1xRTT, 1xEV-DO, HRPD, eHRPD), etc.

As shown, the cellular base station may be equipped to communicate with a network 108 (e.g., a core network of a cellular service provider, a telecommunication network such as a public switched telephone network (PSTN), and/or the Internet, among various possibilities). Thus, the base station 104 may facilitate communication between wireless device 106 and the network 108. In particular, the cellular base station 104 may provide wireless device 106 with various telecommunication capabilities, such as voice, SMS, and/or data services.

A wireless device 106 may be capable of communicating using multiple wireless communication standards. For example, a wireless device 106 may be configured to communicate using at least one wireless networking protocol (e.g., Wi-Fi) and at least one cellular communication protocol (e.g., GSM, UMTS (WCDMA), LTE, LTE-Advanced (LTE-A), 3GPP2 CDMA2000 (e.g., 1xRTT, 1xEV-DO, HRPD, eHRPD), etc.). A wireless device 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates the wireless device 106 in communication with an access point 102 (e.g., access point 102A illustrated in FIG. 1). The wireless device 106 may be a device with wireless network connectivity such as a mobile phone, a hand-held device, a computer or a tablet, or virtually any type of wireless device.

The wireless device 106 may include a processor that is configured to execute program instructions stored in memory. The wireless device 106 may perform any of the methods embodiments described herein by executing such stored instructions. Alternatively, or in addition, the wireless device 106 may include a programmable hardware element such as an FPGA (field-programmable gate array) that is configured to perform any of the method embodiments described herein, or any portion of any of the method embodiments described herein.

The wireless device 106 may be configured to communicate using any of multiple wireless communication protocols. For example, the wireless device 106 may be configured to communicate using one or more of Wi-Fi, GSM, UMTS, CDMA2000, LTE, LTE-A, or GNSS. Other combinations of wireless communication standards are also possible.

The wireless device 106 may include one or more antennas for communicating using one or more wireless communication protocols or technologies. In one embodiment, the wireless device 106 might be configured to communicate using either of multiple wireless communication technologies using a single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the wireless device 106 may share one or more parts of a receive and/or transmit chain between multiple wireless communication technologies.

In some embodiments, the wireless device 106 may include separate transmit and/or receive chains (e.g., including separate antennas and other radio components) for each wireless communication protocol with which it is configured to communicate. As a further possibility, the wireless device 106 may include one or more radios which are shared between multiple wireless communication protocols, and one or more radios which are used exclusively by a single wireless communication protocol. For example, the wireless device 106 might include a shared radio for communicating using either of LTE or 1×RTT (or LTE or GSM), and separate radios for communicating using each of Wi-Fi and Bluetooth. Other configurations are also possible.

Figure 3:
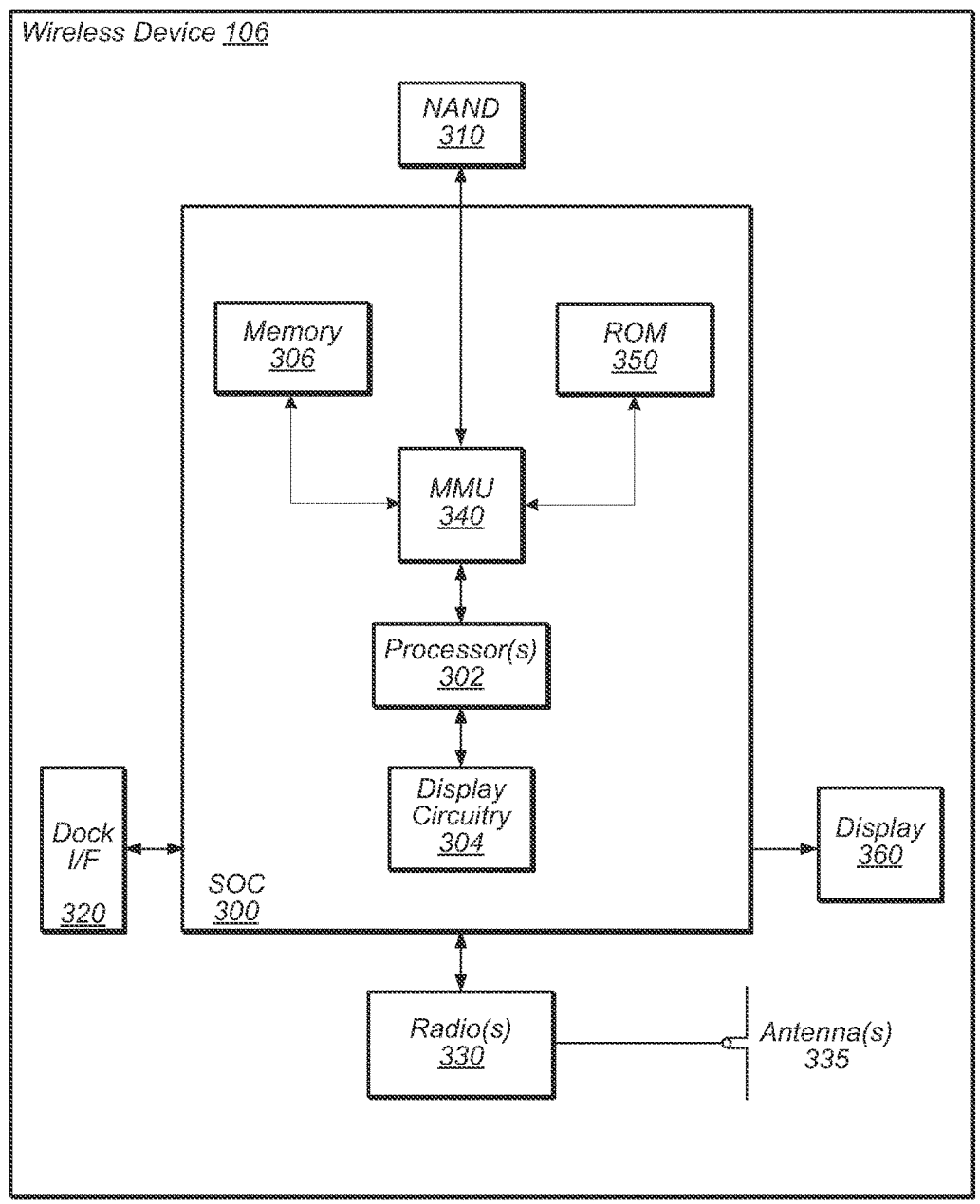
FIG. 3 illustrates an exemplary block diagram of a STA.

FIG. 3—Exemplary Block Diagram of a Wireless Device

FIG. 3 illustrates an exemplary block diagram of a wireless device 106. As shown, the wireless device 106 may include a system on chip (SOC) 300, which may include portions for various purposes. For example, as shown, the SOC 300 may include processor(s) 302 which may execute program instructions for the wireless device 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330 (e.g., including one or more radios), connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the wireless device 106. For example, the wireless device 106 may include various types of memory (e.g., including NAND flash 310), a connector interface 320 (e.g., for coupling to a computer system, dock, charging station, etc.), the display 360, and radio(s) 330 (e.g., for LTE, LTE-A, CDMA2000, Bluetooth, Wi-Fi, GPS, etc.).

As noted above, the wireless device 106 may be configured to communicate wirelessly using multiple wireless communication standards. As further noted above, in such instances, the wireless communication circuitry (radio(s)) 330 may include radio components which are shared between multiple wireless communication standards and/or radio components which are configured exclusively for use according to a single wireless communication standard. As shown, the wireless device 106 may include at least one antenna (and possibly multiple antennas, e.g., for MIMO and/or for implementing different wireless communication technologies, among various possibilities), for performing wireless communication with base stations, access points, and/or other devices. For example, the wireless device 106 may use antenna(s) 335 to perform the wireless communication.

The wireless device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving/interpreting user input.

The wireless device 106 may include hardware and software components for implementing the features described herein. The processor 302 of the wireless device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the wireless device 106, in conjunction with one or more of the other components 300, 304, 306, 310, 320, 330, 335, 340, 350, 360 may be configured to implement part or all of the features described herein.

Figure 4:
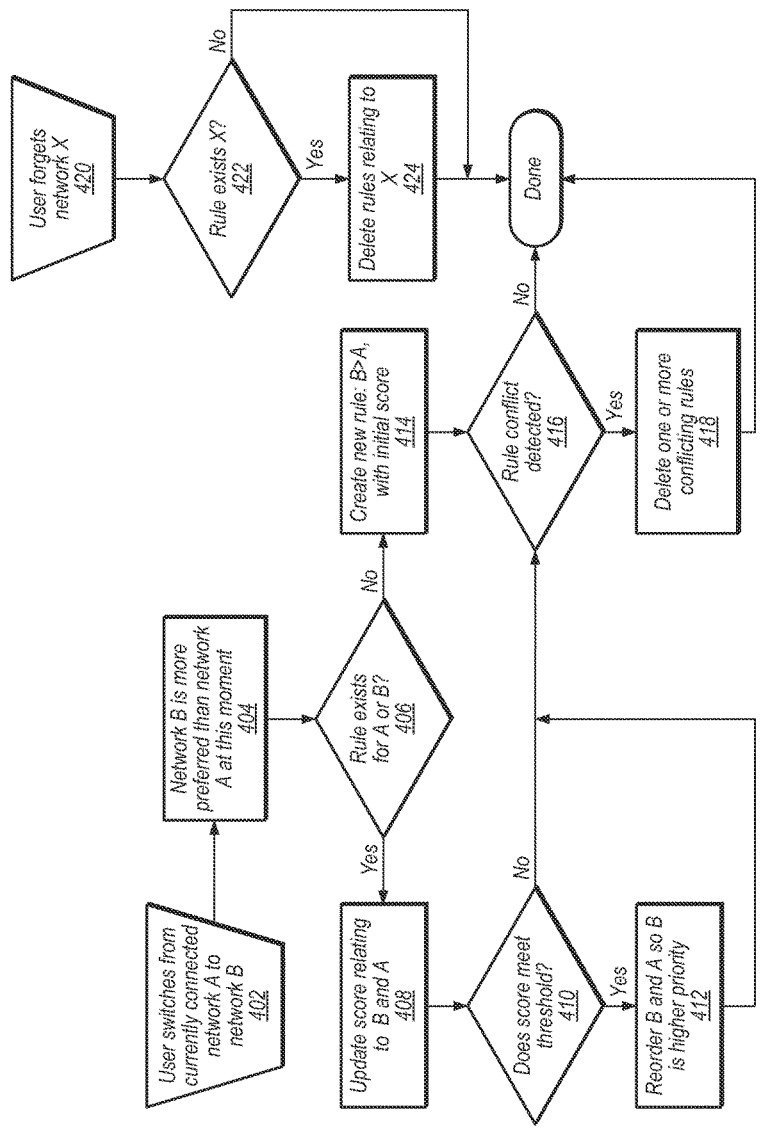
FIG. 4 illustrates a flowchart diagram illustrating an exemplary method by which a wireless device may automatically learn to prioritize networks according to user preferences.

FIG. 4—Wireless Network Prioritization

A wireless device may generate and/or maintain a list of known networks. For example, the list may be a list of networks currently available for connection, a list of networks to which the wireless device has previously connected, or a list of all networks known to the wireless device. In some embodiments, the list may include only networks (e.g., from one of the previously stated categories) that the wireless device is authorized to join automatically. The list may be prioritized (e.g., ranked or ordered) according to connection preference. For example, a network that is more preferred for connection may be prioritized above a less preferred network (e.g., ordered earlier or higher in the list). In some embodiments, the list may initially be prioritized according to a time at which the wireless device last connected to each of the networks included in the list. For example, the network to which the wireless device most recently connected may be treated as the most preferred, and thus ordered first on the list. The list may then be reprioritized according to user preferences.

FIG. 4 illustrates a flowchart diagram illustrating an exemplary method by which a wireless device may automatically learn to prioritize networks according to user preferences. For example, the wireless device may recognize that a user repeatedly instructs the wireless device to switch from a first wireless network to a second wireless network. The wireless device may infer from this behavior that the second wireless network is preferred by the user over the first wireless network. Additionally, the wireless device may learn additional user preferences from other user inputs, such as providing a network profile, or deleting a network or a network profile.

The method shown in FIG. 4 may be used in conjunction with any of the computer systems or devices shown in the above Figures, among other devices. If desired, it may be the case that the method is more particularly implemented by a wireless device, or, more specifically, by a WLAN/Wi-Fi chipset within a wireless device. Some of the method elements shown may be performed concurrently or in a different order than shown, or may be omitted. Additional method elements may also be performed as desired. As shown, the method may operate as follows.

In 402, the user may perform an action preferring a network B over a network A. For example, the user may manually cause the wireless device to switch from the currently connected network A to network B. Network A and network B may be wireless networks, such as Wi-Fi networks. Based on the performed action (e.g., manual switching), it may be recognized that network B is preferred by the user over network A at the present moment, as shown in step 404. Network B may be a network that is already present on the list, or it may be newly added to the list in response to the user's action in 402.

In 406, it may be determined whether a preference rule exists with regard to network A and network B. If no rule exists, then a new preference rule may be created at 414. For example, the rule may define the relationship that network B is preferred over network A (which may be abbreviated herein by the expression B>A). However, a single occurrence of the user manually switching from network A to network B may not provide sufficient basis to infer that the user will consistently prefer network B over network A, e.g., so as to justify automatic switching from network A to network B. Therefore, the preference rule B>A may be associated with a preference score. For example, upon creation of the rule, the rule may be associated with a preference score of 1. Automatic switching from network A to network B may then be justified if the score meets a threshold value.

In some embodiments, the preference rule may also include additional factors, such as location, time of day, etc., such that the preference rule applies only when the additional factors are satisfied. For example, if a rule is created and updated only within a specific geographic location or area, then the rule may be defined such that it may be applied only within the specific geographic location or area.

If, at 406, a preference rule is determined to exist already with regard to network A and network B, then the preference score assigned to the rule may be updated at 408. For example, if the preference rule B>A is determined to exist already, then the associated preference score may be increased. On the other hand, if a preference rule A>B is determined to exist already, then the associated preference score may be decreased. Alternatively, if the preference rule A>B is determined to exist already, then the rule may be deleted, which would cause the method to terminate.

The amount by which the preference score may be increased or decreased at 408 may be a fixed amount. For example, the preference score may merely be incremented or decremented. Alternatively, the amount by which the preference score may be increased or decreased at 408 may vary dynamically based on one or more additional factors, such as location, time of day, network type, relative security of the networks, elapsed time since a previous change in network or since the preference rule was created or updated, etc. For example, when a user manually switches to a new network, a preference score associated with a rule preferring the new network may be increased by a larger amount where the user switches from a public network to a private network than where a user switches from the private network to the public network. Alternatively, or additionally, the preference rule may be associated with a specific geographic location, such that the associated preference score is changed less, or not at all, if the user manually switches between networks while at another location. As another example, a preference score associated with a rule preferring the new network may be increased by a larger amount where the user remains connected to the new network for a long period of time.

At 410, it may be determined whether the preference score meets the threshold value. The threshold value may be a fixed value, or may be determined dynamically based on one or more additional factors, such as, e.g., those listed above. In some embodiments, the threshold value may be configurable by a user or administrator. If the preference score meets the threshold value, then the list may be reprioritized accordingly at 412. For example, if the preference rule B>A is determined to meet the threshold value (e.g., the preference score is at least equal to a threshold value of 3), then the list may be reprioritized to reflect that network B is preferred over network A. For example, if network A was previously ordered higher than network B (e.g., because the wireless device previously connected to network A more recently than to network B), then the list may be reordered such that network B is ordered higher than network A.

In embodiments in which the preference rule includes additional factors, such as location, time of day, etc., such additional factors may also be tested at 410. For example, if the preference rule is defined such that the preference rule applies only at a defined geographic location, then the reprioritization may take place only if the wireless device is determined to be located at the defined geographic location.

It should be recognized that the preceding discussion of preference rules and preference scores is merely exemplary, and that other embodiments are possible. For example, in another embodiment, when a new preference rule is created with regard to network A and network B (i.e., at step 414), then each of network A and network B may be assigned a preference value associated with the rule. The preference score may then be determined as a function of the two preference values, such as the difference between the two values. In such an embodiment, the user manually switching from network A to network B may cause, at 408, the preference value of network B ($V_B$) to be incremented or otherwise increased. Similarly, the user manually switching from network B to network A may cause, at 408, the preference value of network A ($V_A$) to be incremented or otherwise increased. The preference score associated with the rule may be determined as a relationship (e.g., the difference) between the two preference values associated with the rule. For example, if the rule is defined as B>A, then the preference score may be defined as $V_B - V_A$. If the preference score is positive, with an absolute value meeting the threshold, then the list may be reprioritized to reflect that network B is preferred over network A. Similarly, if the preference score is negative, with an absolute value meeting the threshold, then the list may be reprioritized to reflect that network A is preferred over network B. Alternatively, only positive scores may be considered. In such an embodiment, the preference rule B>A may be deleted in response $V_A$ meeting or exceeding $V_B$, and/or in response to the user manually switching from network B to network A.

In some embodiments, the action preferring a network B over a network A at 402 may be an action other than manually switching between networks. For example, a user or administrator may provide a profile for one or more wireless networks that expressly defines one or more preference rules, preference scores, or network prioritizations. In response to receiving the profile, the preference rules, preference scores, and/or the prioritized list may be updated. For example, the profile may define a new rule, and may further specify that the new rule be created with an initial preference score meeting the threshold.

At 416, the existing preference rules may be inspected for logical conflicts. For example, a new preference rule relating to network A and network B may be created at 414 or updated at 408 to indicate that network B is preferred or prioritized over network A. It may then be determined at 416 that existing preference rules already indicate C>B and A>C. In this case, the creation of the preference rule B>A may cause a circular assignment of preference.

If a conflict is detected, one or more preference rules may be deleted at 418. For example, all preference rules involving non-preferred network (i.e., network A) may be deleted. In that case preference rules A>C and B>A would be deleted, and only rule C>B would remain. Alternatively, the newest rule (i.e., B>A) may be preserved, while one or more of the other conflicting rules may be deleted. Alternatively, one or more rules having the lowest preference score may be deleted. In some embodiments, user input may be requested to select or confirm one or more preference rules to delete or preserve.

In some embodiments, logical conflicts may be resolved by other factors, such as location or time of day, without requiring deletion of rules. For example, in the above case of circular assignment of preference, the rule B>A may be associated with a geographic location, such that the rule is applied only in that geographic location. Similarly, one or more of rules A>C and C>B may be associated with another geographic location. Thus, the rules may not actually conflict, as they may not be applied at the same geographic location.

At 420, a user may cause the wireless device to forget known network X. At 422, it may be determined whether a preference rule exists relating to network X. Any preference rules relating to network X may be deleted at 424. Similarly, a user may cause the wireless device to delete a network profile. In response, any rules defined by the profile may be deleted.

Figure 5:
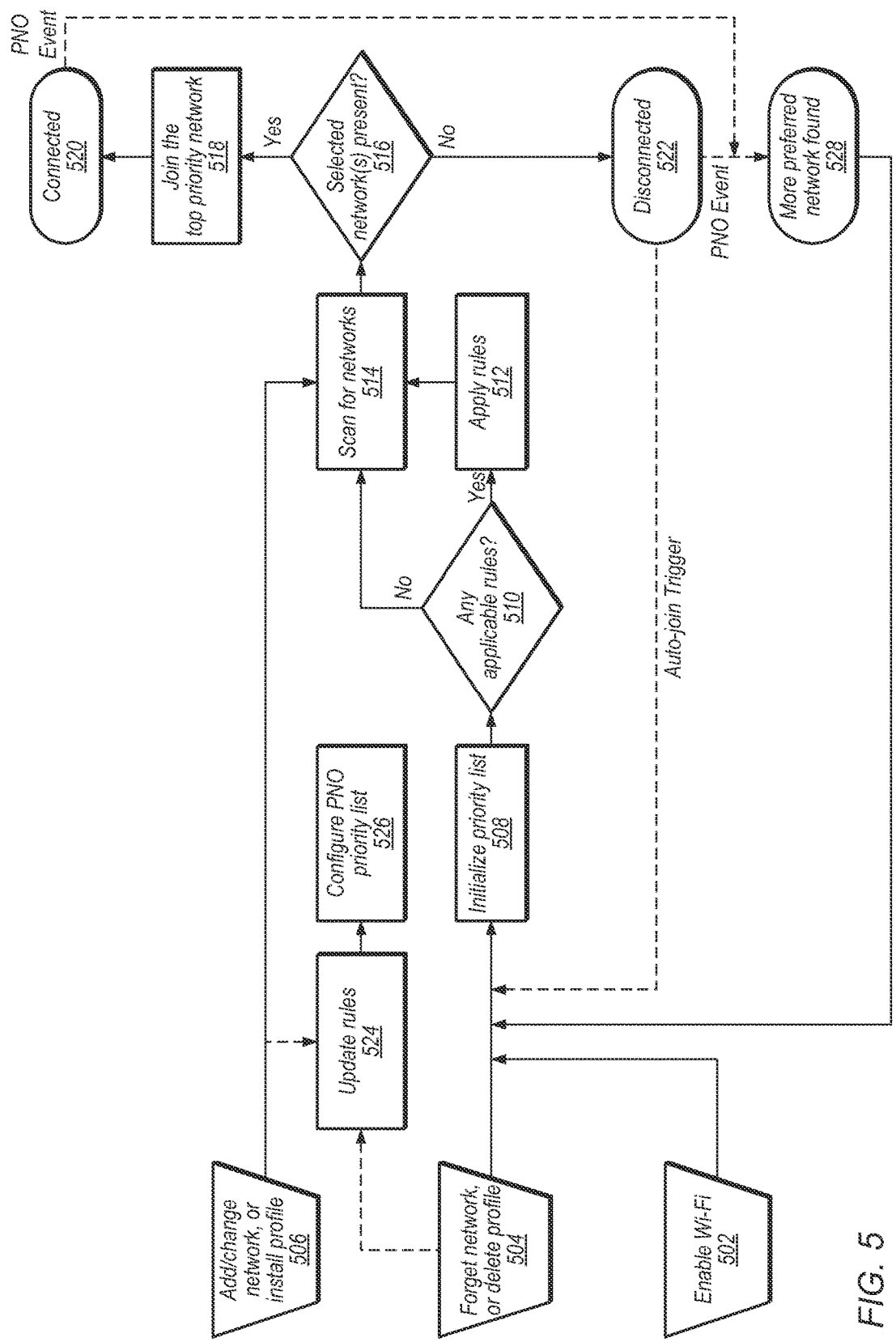
FIG. 5 illustrates a flowchart diagram illustrating an exemplary method by which a wireless device may automatically connect to a preferred network.

FIG. 5—Preferred Network Discovery

A wireless device may automatically detect and join a preferred network, e.g., by using a prioritized list like the list discussed in connection with FIG. 4. FIG. 5 illustrates a flowchart diagram illustrating an exemplary method by which a wireless device may automatically connect to a preferred network. The method shown in FIG. 5 may be used in conjunction with any of the computer systems or devices shown in the above Figures, among other devices. If desired, it may be the case that the method is more particularly implemented by a wireless device, or, more specifically, by a WLAN/Wi-Fi chipset within a wireless device. Some of the method elements shown may be performed concurrently or in a different order than shown, or may be omitted. Additional method elements may also be performed as desired. As shown, the method may operate as follows.

The method of FIG. 5 may be initiated at least by any one of events 502, 504, or 506. At 502, a radio access technology (RAT) to be used may be enabled. For example, if the network to be joined is a Wi-Fi network, then Wi-Fi functionality of the wireless device may be enabled at 602.

At 508, a priority list may be initialized. For example, the initial priority list may be a complete or partial list of networks to which the wireless device has previously connected. In some embodiments, the priority list may include only networks that the wireless device is authorized to join automatically. In a preferred embodiment, the initial priority list may comprise a list of most recently used (MRU) networks. In another embodiment, the initial priority list may comprise a priority list modified during a previous iteration of the method of FIG. 5.

The priority list may be prioritized (e.g., ranked or ordered) according to connection preference. For example, a network that is more preferred for connection may be prioritized above a less preferred network (e.g., ordered earlier or higher in the list). In some embodiments, the list may initially be prioritized according to a time at which the wireless device last connected to each of the networks included in the list. For example, the network to which the wireless device most recently connected may be treated as the most preferred, and thus ordered highest on the list.

At 510, it is determined whether any preference rules exist that relate to any of the networks included on the priority list. For example, preference rules may have been created according to any of the embodiments disclosed in connection with FIG. 4. In some embodiments, a preference rule may be excluded based on other factors, such as location, time of day, etc. For example, a preference rule may exist that relates to one or more of the networks included on the priority list, but which is limited to a geographic location. The preference rule may be considered at 510 only if the wireless device is presently located at the geographic location.

If any preference rules are found to apply to networks included in the priority list, then the priority list may be modified at 512 based on the applicable preference rules, e.g., as discussed in connection with FIG. 4. For example, if a first network appears higher on the preference list than a second network, and a first rule indicates that the second network is preferred over the first network, then the two networks may be reordered in the preference list based on the first preference rule. Additionally, if a second rule indicates that a third network is preferred over the first network, and the third network does not appear on the priority list, then the third network may be added to the priority list, above the first network.

At 514, a scan may be performed for available networks of the RAT being used (e.g., for available Wi-Fi networks). For example, the scan may comprise a broadcast probe for non-hidden networks and/or one or more directed probes for hidden networks. For example, the scan may comprise a directed probe for each network included in the priority list that is hidden. In some embodiments, the scan may include only directed probes for the networks included in the priority list, so as to reduce the time and power required for scanning In other embodiments, the scan may be more thorough, so as to find networks included in the priority list that might have been reconfigured to a different channel.

At 516, it may be determined whether any of the selected networks are present. At this stage, the selected networks may comprise the networks included in the priority list. For example, the scan results may be compared to the priority list to determine whether any networks included in the priority list are available. If so, the wireless device may join the highest-priority network of the available selected networks at 518. At 520, the wireless device may remain in a connected state awaiting later events.

If no selected network is available at 516, then the wireless device may enter a disconnected state at 522, in which it is not connected to a network of the RAT being used. For example, if the RAT being used is Wi-Fi, then the wireless device may not be connected to a Wi-Fi network while in the disconnected state. It should be noted that the wireless device may nevertheless remain connected to wired or wireless networks of other RATs (e.g. an LTE network) that are not involved in the method of FIG. 5. The wireless device may remain in disconnected state at 522 awaiting later events.

The method may alternatively be initiated at 504 by an instruction to remove network information. For example, the instruction may be to forget a specified network and/or delete a specified network profile. In response to the instruction, the specified action may be performed, e.g., the specified network may be forgotten, or the specified network profile may be deleted. Additionally, steps 508, 510, 512, 514, 516, 518, 520, and/or 522 may be performed as discussed above. However, if the instruction specifies a network to be forgotten, then the specified network may be removed from any existing instantiations of the priority list, and may not be included in the initial priority list at 508.

Additionally, in response to the instruction, the preference rules may be updated at 524, e.g., as discussed in connection with FIG. 4. For example, in response to an instruction to forget a network, any rules associated with the network may be deleted. Thus, the network would not be added to the priority list at 512 in response to any rules. Similarly, in response to an instruction to forget a network profile, any rules defined by the network profile may be deleted.

At 526, a preferred network offload (PNO) priority list may be configured for use in subsequent PNO scans. The process of configuring the PNO priority list may be similar or identical to the process of generating a priority list as defined at 508, 510, and 512.

The method may alternatively be initiated at 506 by an instruction to add network information. For example, the instruction may be to add or switch to a specified network, or to add a specified network profile. In response to the instruction, the preference rules may be updated at 524, e.g., as discussed in connection with FIG. 4. For example, in response to an instruction to add a network profile, any preference rules defined in the network profile may be added. Similarly, preference rules may be updated at 524 (e.g., preference scores modified) in response to an instruction to add or switch to a network. At 526, the PNO priority list may be configured, as discussed above.

Additionally, in response to the instruction, a scan may be performed at 514, as discussed above. For example, the scan may comprise a directed probe for the specified network. In some alternative embodiments, an instruction at 506 to add a specified network profile may cause the method to proceed to 508, as discussed above, rather than proceeding directly to 514 as shown in FIG. 5.

At 516, it may be determined whether any of the selected networks are present. For example, in response to an instruction to add or switch to a specified network, the specified network may be the only selected network. Therefore, the scan results may be examined to determine whether the specified network is available. If so, the specified network may be the highest priority network (i.e., the only network) of the available selected networks. The wireless device may therefore join the specified network at 518. At 520, the wireless device may remain in a connected state awaiting later events. In other embodiments, it may already be known that the specified network is available at the time an instruction to add or switch to a specified network is received. In that case, steps 514 and 516 may be omitted, and the specified network may be joined immediately in response to the instruction.

If no selected network is available at 516, then the wireless device may enter the disconnected state at 522, as discussed above. The wireless device may remain in disconnected state at 522 awaiting later events.

While the wireless device is in the disconnected state at 522, detection of an auto-join trigger may cause the method to return to 508 to again search for a preferred network. Examples of auto join triggers may include, for example, an instruction to remove network information, as discussed at 504, or notification of one or more of the following events or instruction to perform one or more of the following events: turning on or unlocking a screen of the wireless device, starting a networking software application (e.g., instant messaging, browser, etc). Additionally, expiration of a retry timer may serve as an auto join trigger.

While the wireless device is in the connected state at 520 or the disconnected state at 522, the wireless device may perform one or more subsequent scans for available networks. When the wireless device is in the connected state at 520, the subsequent scans may be specifically intended to seek available networks that are preferred more highly than network to which the wireless device is presently connected. The PNO priority list configured at 526 may be used to determine network preference. Alternatively, the priority list generated at 512 may be used.

For example, a user may prefer a private home network that is available only in the user's residence over a public community network that is available both in the residence and also throughout the community. When the user is away from the residence, the wireless device may automatically join the community network because the preferred home network is not available. While in the connected state at 520, the wireless device may perform subsequent scans to determine whether the preferred home network has become available. In this way, the wireless device may automatically join the preferred home network when the user returns to the residence.

Reducing the power used to scan for available networks is desirable. Therefore, the time between subsequent scans may be dynamic based at least in part on power considerations. For example, subsequent scans may be performed less frequently, or not performed at all, when the wireless device is low on power. Additionally, the delay between subsequent scans may increase over time. For example, each time a subsequent scan is performed with no more-preferred network found, the delay before performing the next subsequent scan may be increased. In some embodiments, the delay time may be modified based on other factors, such as movement to a new location or determination that the currently connected network is a public or multi-AP network.

The subsequent scans may be PNO scans. To perform a PNO scan, the wireless device may provide the networks to be included in the search (e.g., the networks included in the priority list) to a RAT chip, such as a Wi-Fi chip. For example, the RAT chip may be provided with the PNO priority list generated at 526. The RAT chip may then perform one or more PNO scans for the provided networks without further interaction by the host processor of the wireless device. This may result in power savings and a reduced processing load at the host processor. For example, the host processor may remain in a sleep state while the PNO scans are performed. The RAT chip may notify the host processor of an event of interest, such as finding a more-preferred network.

Scanning for networks and/or switching between networks may be disruptive to the user's experience. For example, performing a subsequent scan may conflict with data transmission occurring on the present connection. Additionally, switching between networks may cause notifications and interruptions in software applications executing on the wireless device, as each software application may be required to tear down its socket and lose connectivity while the switch is occurring. Therefore, in some embodiments, subsequent scans and/or resulting changes in network may be performed opportunistically. For example, the subsequent scans or network changes may be performed only when no data transfer is occurring, only at idle time, only when the host processor is in a sleep state, only when the screen of the wireless device is off, etc. Subsequent scans may be immediately canceled when interrupted by data transfer. Similarly, if a more-preferred network is found during a subsequent scan, a change to the more-preferred network may not occur if the received signal strength indication (RSSI) of the more-preferred network does not meet a minimum delta, because there is a risk that the weak signal of the more-preferred network may be lost.

In some embodiments, subsequent scans may not be performed in response to additional factors. For example, subsequent scans may not be performed when the wireless device meets a certain motion profile, such as walking or driving, because the available networks may change rapidly.

Figure 6:
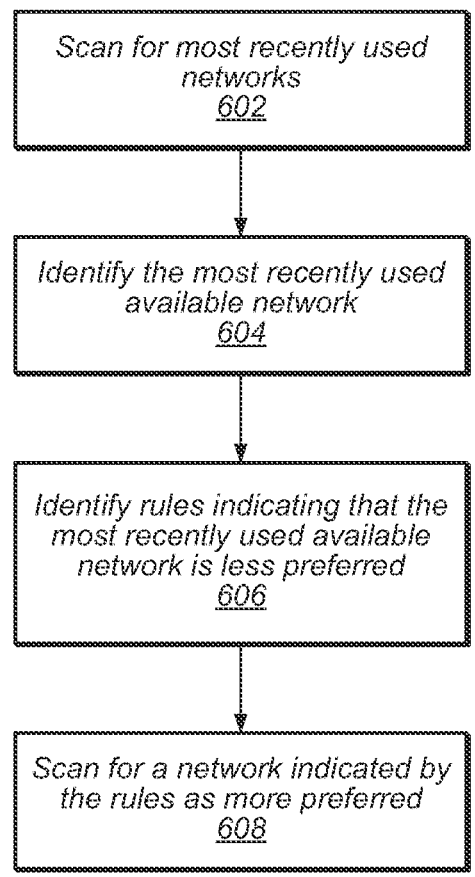
FIG. 6 illustrates a flowchart diagram illustrating an exemplary method by which a wireless device may perform multi-stage network discovery.

FIG. 6—Multi-Stage Network Discovery

The methods discussed above may be adapted to focus on certain performance characteristics. For example, the method of FIG. 5 may be further adapted to facilitate making an initial connection as quickly as possible when the RAT to be used is enabled. FIG. 6 illustrates a flowchart diagram illustrating an exemplary method by which a wireless device may perform multi-stage network discovery, e.g., to rapidly automatically connect to a preferred network. The method shown in FIG. 6 may be used in conjunction with any of the computer systems or devices shown in the above Figures, among other devices. If desired, it may be the case that the method is more particularly implemented by a wireless device, or, more specifically, by a WLAN/Wi-Fi chipset within a wireless device. Some of the method elements shown may be performed concurrently or in a different order than shown, or may be omitted. Additional method elements may also be performed as desired. As shown, the method may operate as follows.

The method of FIG. 6 may be used in conjunction with any of the previous methods. For example, steps 602 through 608 may replace steps 510 through 514 of FIG. 5. Alternatively, steps 602 through 608 may provide an alternate path between 502 and 516 of FIG. 5.

At 602, a scan may be performed for the networks to which the wireless device has most recently connected (i.e. MRU networks). A list of such networks may have been generated, for example, at 508 of FIG. 5. This scan may comprise a quick targeted scan for these known networks.

At 604, a most recently used available network may be identified based on the results of the scan. For example, if the scan at 602 is based on an MRU list, then the highest-ordered available network on the MRU list may be the most recently used available network.

However, application of priority rules may identify additional networks, not on the MRU list, as being prioritized higher than the identified most recently used network. To minimize delay caused by additional scanning, targeted scans may be performed for only the most relevant preferred networks. Specifically, at 606, one or more rules may be identified that indicate the identified most recently used network is less preferred than another network. A targeted scan may then be performed for the other network at 608. If found, the other network may be joined. If the other network is not found, then the identified most recently used network may be joined. Thus, a highest-priority network may be identified without delay caused by completion of a full scan for all available networks.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a wireless device) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for generating a wireless network preference list for a wireless device, the method comprising:
by the wireless device:
ordering a plurality of wireless networks based on a time that the wireless device last joined each of the wireless networks, wherein more recently joined wireless networks are ordered higher than less recently joined networks, wherein a first wireless network is ordered higher than a second wireless network;
determining and storing a first relationship score specifying an amount by which the second wireless network is preferred over the first wireless network;
determining and storing a second relationship score specifying an amount by which a third wireless network is preferred over the second wireless network;
determining and storing a third relationship score specifying an amount by which the third wireless network is preferred over the first wireless network, wherein the first relationship score is changeable without changing either of the second and third relationship scores;
determining that the first relationship score exceeds a threshold; and
changing the order of the plurality of wireless networks to order the second wireless network higher than the first wireless network in response to the determining that the first relationship score exceeds the threshold;
wherein the wireless device is configured to automatically connect to a highest-ordered available wireless network of the plurality of wireless networks.

2. The method of claim 1, further comprising:
receiving from a user an indication to switch from the first wireless network to the second wireless network; and
increasing the first relationship score in response to the receiving the indication.

3. The method of claim 2, further comprising:
receiving from the user an indication to switch from the second wireless network to the first wireless network; and
reducing the first relationship score in response to the receiving the indication to switch from the second wireless network to the first wireless network.

4. The method of claim 2, the method further comprising:
receiving from the user an indication to switch from the second wireless network to the third wireless network; and
increasing the second relationship score in response to the receiving the indication to switch from the second wireless network to a third wireless network, wherein increasing the second relationship score does not change the first relationship score or the third relationship score.

5. The method of claim 2, the method further comprising:
determining logical inconsistency between at least two of the first, second, and third relationship scores; and
deleting one or more of the first, second, and third relationship scores, based on the determining the logical inconsistency.

6. The method of claim 1, further comprising:
receiving a network profile indicating that the second wireless network is preferred over the first wireless network; and
setting the first relationship score to exceed the threshold in response to the receiving the network profile.

7. The method of claim 1, further comprising:
determining that the first relationship score is associated with a geographic location; and
determining that the wireless device is located at the geographic location, wherein the changing the order of the plurality of wireless networks is further in response to the determining that the wireless device is located at the geographic location.

8. A wireless device configured to communicate via a wireless connection, the wireless device comprising:
a radio; and
a processing element operably coupled to the radio;
wherein the wireless device is configured to:
order a plurality of wireless networks based on a time that the wireless device last joined each of the wireless networks, wherein more recently joined wireless networks are ordered higher than less recently joined networks, wherein a first wireless network is ordered higher than a second wireless network;
determine and store a first relationship score specifying an amount by which the second wireless network is preferred over the first wireless network;
determine and store a second relationship score specifying an amount by which a third wireless network is preferred over the second wireless network;
determine and store a third relationship score specifying an amount by which the third wireless network is preferred over the first wireless network, wherein the first relationship score is changeable without changing either of the second and third relationship scores;
determine that the relationship score exceeds a threshold;
change the order of the plurality of wireless networks to order the second wireless network higher than the first wireless network in response to the determining that the first relationship score exceeds a threshold;
determine that at least one wireless network of the plurality of wireless networks is available for connection; and
automatically connect to a highest-ordered wireless network of the at least one wireless network that is available for connection.

9. The wireless device of claim 8, further comprising:
a user interface operably coupled to the processing element;
wherein the wireless device is further configured to:
receive via the user interface an indication to switch from the first wireless network to the second wireless network; and
increase the first relationship score in response to the receiving the indication.

10. The wireless device of claim 9, wherein the wireless device is further configured to:
receive via the user interface an indication to switch from the second wireless network to the first wireless network; and
reduce the first relationship score in response to the receiving the indication to switch from the second wireless network to the first wireless network.

11. The wireless device of claim 9, wherein the wireless device is further configured to:
determine logical inconsistency between at least two of the first, second and third relationship scores; and
delete one or more of the first, second and third relationship scores, based on the determining the logical inconsistency.

12. The wireless device of claim 8, wherein the wireless device is further configured to:
determine that the first relationship score is associated with a geographic location; and
determine that the wireless device is located at the geographic location, wherein the changing the order of the plurality of wireless networks is further in response to the determining that the wireless device is located at the geographic location.

13. The wireless device of claim 8, wherein the wireless device is further configured to:
determine, while connected to the highest-ordered wireless network, that another wireless network of the plurality of wireless networks has become available for connection, wherein the other wireless network is higher-ordered than the presently connected wireless network; and
connect to the other wireless network in response to the determining that the other wireless network has become available for connection.

14. The wireless device of claim 8, the device further comprising:
a user interface operably coupled to the processing element;
wherein the wireless device is further configured to:
receive via the user interface an indication to switch from the second wireless network to the third wireless network; and
increase the second relationship score in response to the receiving the indication to switch from the second wireless network to a third wireless network, wherein increasing the second relationship score does not change the first relationship score or the third relationship score.

15. A non-transitory computer-readable memory medium storing instructions executable by a processor of a wireless device, the instructions configured to cause the wireless device to:
- order a plurality of wireless networks based on a time that the wireless device last joined each of the wireless networks, wherein more recently joined wireless networks are ordered higher than less recently joined networks, wherein a first wireless network is ordered higher than a second wireless network;
- determine and store a first relationship score specifying an amount by which the second wireless network is preferred over the first wireless network;
- determine and store a second relationship score specifying an amount by which a third wireless network is preferred over the second wireless network;
- determine and store a third relationship score specifying an amount by which the third wireless network is preferred over the first wireless network, wherein the first relationship score is changeable without changing either of the second and third relationship scores;
- determine that the first relationship score exceeds a threshold;
- change the order of the plurality of wireless networks to order the second wireless network higher than the first wireless network in response to the determining that the first relationship score exceeds a threshold;
- determine that at least one wireless network of the plurality of wireless networks is available for connection; and
- automatically connect to a highest-ordered wireless network of the at least one wireless network that is available for connection.

16. The non-transitory memory medium of claim 15, wherein the instructions are further configured to cause the wireless device to:
- receive from a user an indication to switch from the first wireless network to the second wireless network; and
- increase the first relationship score in response to the receiving the indication.

17. The non-transitory memory medium of claim 16, wherein the instructions are further configured to cause the wireless device to:
- receive from a user an indication to switch from the second wireless network to the first wireless network; and
- reduce the first relationship score in response to the receiving the indication to switch from the second wireless network to the first wireless network.

18. The non-transitory memory medium of claim 15, wherein the instructions are further configured to cause the wireless device to:
- determine that the first relationship score is associated with a geographic location; and
- determine that the wireless device is located at the geographic location, wherein the changing the order of the plurality of wireless networks is further in response to the determining that the wireless device is located at the geographic location.

19. The non-transitory memory medium of claim 15, wherein the instructions are further configured to cause the wireless device to:
- determine, while connected to the highest-ordered wireless network, that another wireless network of the plurality of wireless networks has become available for connection, wherein the other wireless network is higher-ordered than the presently connected wireless network; and
- connect to the other wireless network in response to the determining that the other wireless network has become available for connection.

20. The non-transitory memory medium of claim 15, wherein the instructions are further configured to cause the wireless device to:
- receive from a user an indication to switch from the second wireless network to the third wireless network; and
- increase the second relationship score in response to the receiving the indication to switch from the second wireless network to a third wireless network, wherein increasing the second relationship score does not change the first relationship score or the third relationship score.

* * * * *